United States Patent [19]
Oh

[11] Patent Number: 5,145,252
[45] Date of Patent: Sep. 8, 1992

[54] KNEADING WING SENSING APPARATUS OF MICROWAVE OVEN FOR BAKING A BREAD

[75] Inventor: Keun-Yeong Oh, Suweon, Rep. of Korea

[73] Assignee: Samsung Electronics Co., Ltd., Suweon, Rep. of Korea

[21] Appl. No.: 582,385

[22] Filed: Sep. 14, 1990

[30] Foreign Application Priority Data

Oct. 17, 1989 [KR] Rep. of Korea .................. 89-14927

[51] Int. Cl.$^5$ .................. A21C 1/14; B01F 13/04; H05B 6/64; A47J 27/00
[52] U.S. Cl. .................. 366/98; 366/601; 99/327; 99/348; 219/10.558; 219/10.55 R
[58] Field of Search .................. 219/10.55 B, 10.55 E, 219/10.55 F, 10.55 R; 99/451, DIG. 14, 325-327, 347, 348; 366/69, 78, 97, 98, 142, 601

[56] References Cited

U.S. PATENT DOCUMENTS

| | | | |
|---|---|---|---|
| 4,538,509 | 9/1985 | Ojima et al. | 366/98 |
| 4,836,683 | 6/1989 | Aoyama | 366/98 |
| 4,845,327 | 7/1989 | Iwabuchi et al. | 219/10.55 F |
| 4,977,822 | 12/1990 | Seo et al. | 99/348 |
| 4,984,512 | 1/1991 | Takahashi et al. | 366/98 |

*Primary Examiner*—Bruce A. Reynolds
*Assistant Examiner*—Toan Vinh To
*Attorney, Agent, or Firm*—Robert E. Bushnell

[57] ABSTRACT

A kneading wing sensing apparatus which, when user kneads materials for baking bread, detects whether the kneading wing is placed into a container or not. The main principal for detecting the kneading wind is to compare the pulse signal with a memorized pulse signal. The memorized upper limit value is a state of revolution without the kneading wing and the lower limit value is a state of revolution with the kneading wing in an unusual revolution. The detecting method of the revolution is a rotating disk inclusive of multiple holes and a sensing device attached to a motor.

15 Claims, 5 Drawing Sheets

KNEADING WING SENSING APPARATUS OF MICROWAVE OVEN FOR BAKING A BREAD

BACKGROUND OF THE INVENTION

1. Field of the Invention

The present invention relates to a kneading wing sensing apparatus of microwave oven for baking bread. More particularly, it detects whether the kneading wing is placed in a container or not and signals when the kneading wing is not placed in the container.

2. Related Art

Most conventional kneading apparatus for baking break utilize a kneading wing which can be separated from a container for efficient kneading.

The kneading wing is rotated by a motor. The kneading apparatus does not have a detecting means for detecting whether the kneading wing is settled or not.

Accordingly, if a user operates the kneading apparatus carelessly so that the kneading wing is not settled in the container, the materials for to be kneaded are wasted because the materials are not kneaded.

Another apparatus for confirming kneaded state is known as Japanese utility model laid open publication so 60-68985. This art is illustrated in FIG. 6. A container 60 has a kneading wing 62 at its inner bottom and the kneading wing 62 is settled on a shaft inclusive of a pulley 61 which receives a rotation force.

A temperature detecting device 64 is fixed into a casing 63 and the casing 63 is inserted into the container 60.

In kneading with the apparatus, materials for bread are put into the container 60 and the kneading wing 62 is rotated by rotation of the pulley 61. The temperature detecting device 64 detects whether the materials maintain a proper temperature or not. But this apparatus can not detect whether the kneading wing is placed into the container or not.

SUMMARY OF THE INVENTION

The object of the present invention is to sense whether a kneading wing is placed into a container and to generate a pulse signal which represents states of revolution with or without the kneading wing.

The generated pulse signal is compared with memorized standard revolution numbers of a motor and so it can be found by comparing data whether the kneading wing is placed in a container or not.

If the compared data indicates that the kneading wing is not placed in the container, it signals a user and thereby prevents power and materials from being wasted.

BRIEF DESCRIPTION OF THE DRAWINGS

The foregoing and other objects, features and advantages of the present invention should become apparent from the following description taken in conjunction with the accompanying drawings, in which.

DETAILED DESCRIPTION OF THE PREFERRED EMBODIMENT

The present invention includes a control means, a driving means, a sensing means and an alarm means.

The control means compares input data with memorized data, and transmits a control signal based on the compared result.

The driving means rotates a motor according to the control signal. The sensing means detects the number of rotations of the motor, generates pulse signals corresponding to the number of rotations, and transmits the pulse signals to the control means.

The alarm means generates an alarm signal only when the control signal indicates that the motor is not rotating or that a kneading wing is not installed into the container. The control means is a micro computer.

The driving means comprises resistors, a condensor, a transistor, a triac and a photo coupler, which and rotates the motor by triggering the triac by the control signal through the transistor and the photo coupler serially.

The sensing means includes resistors, a transistor and a sensing device. The sensing device is a photo interrupter, which senses rotation of the motor by means of a rotating member having multiple holes at regular intervals on its periphery and being rotated on the shaft of the motor.

Figure 1:
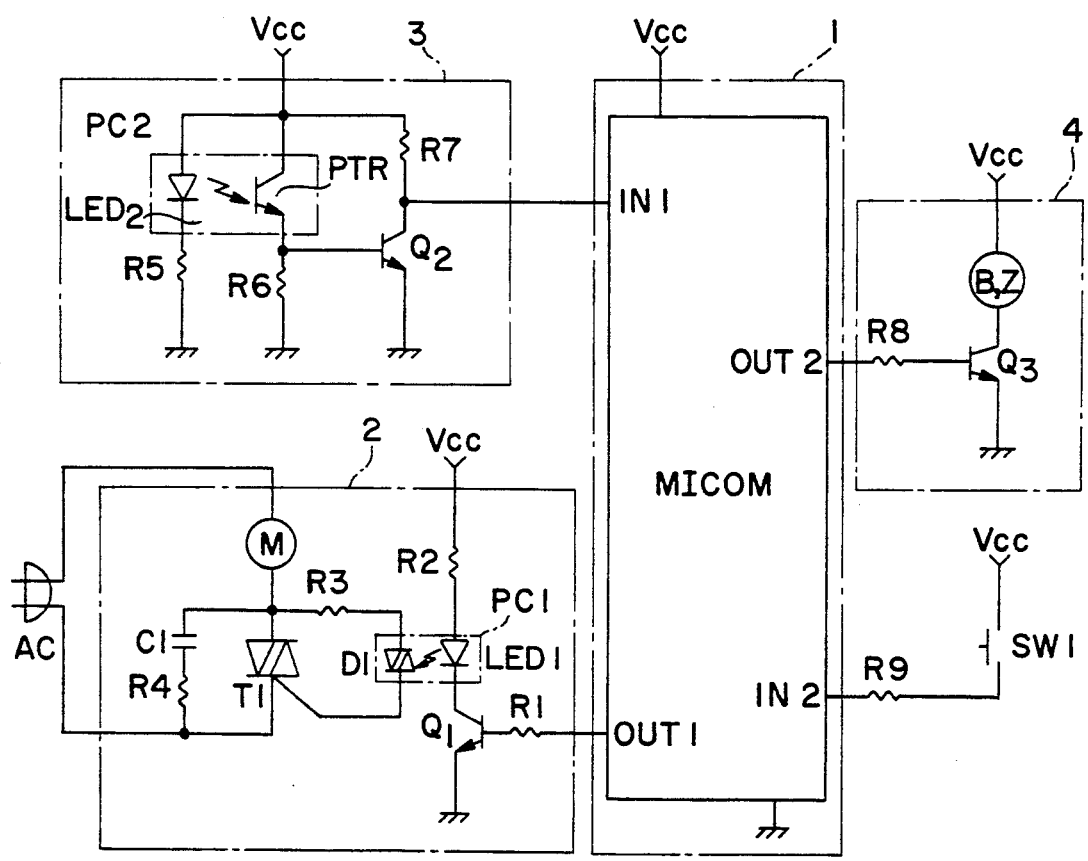
FIG. 1 is a circuit diagram of the present invention.

Referring first to FIG. 1, a circuit diagram,, of the present invention is shown. It includes a control part 1 as the control means, a driving part 2 as the driving means, a sensing part 3 as the sensing means and an alarm part 4 as the alarm means. The control part 1 is mainly composed of a micro computer MICOM, which compares input data with memorized data. The driving part 2 rotates a motor M according to the transmitting signal of the control part 1, which includes a triac T1, a transistor Q1, resistances R1-R4, a condenser C1 and a photo coupler PC1.

The sensing part 3 comprises a sensing device PC2 inclusive of a light emission diode LED2 and a light receiving device PTR, a transistor Q2 and resistances R5-R7, which generates a pulse signal owing to a revolution detecting of the motor M, and which transmits the pulse signal to the control part 1.

The alarm part 4 includes a resistor R8, a transistor Q3 and a buzzer BZ, which receives an output from the control part 1 in case that a kneading wing is not installed in a container, and which generates an alarm based on to the output of the control part. The photo coupler PC1 is composed of a light emission diode LED1 as a light emitting device and a diac D1 as a light receiving device.

The sensing device PC2 is a photo interrupter having a light emission diode LED2 as a light emission device and a photo transistor PTR as a light receiving device.

Figure 2:
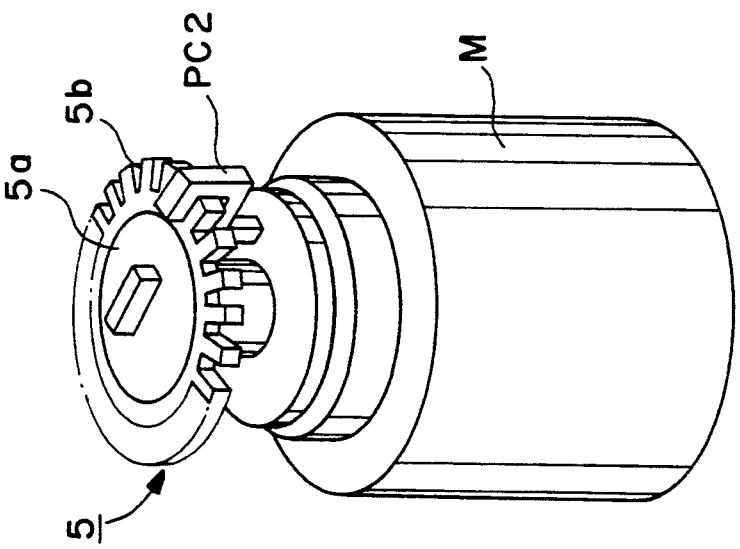
FIG. 2 is a perspective view of the present invention showing a rotating member and a sensing device.

R9 is a resister and SW1 is a switch. Vcc is a supplied power, AC is a plug,

IN1 is an input terminal which receives a signal of the sensing parts 3,

IN2 is an input terminal which receives a signal of the switch SW1,

OUT1 is an output terminal which transmits a signal for rotating the motor and OUT2 is an output terminal which transmits a signal of alarm to the buzzer. In FIG. 2, a rotating member 5 as a disc type is fixed at a rotation shaft end of the motor and a c-shaped sensing device PC2 is fixed on the motor M enough to pass the edge parts of the rotating 5 therein.

The edge has multiple hole means 5b at regular intervals and the edge is fixed at the periphery of a rotating disk 5a.

The sensing device PC2 is turned on and off repeatedly by the rotation of hole means 5b.

Upper and lower parts of the sensing device PC2 have a light emission diode LED2 and a light receiving device PTR respectively.

Figure 3:
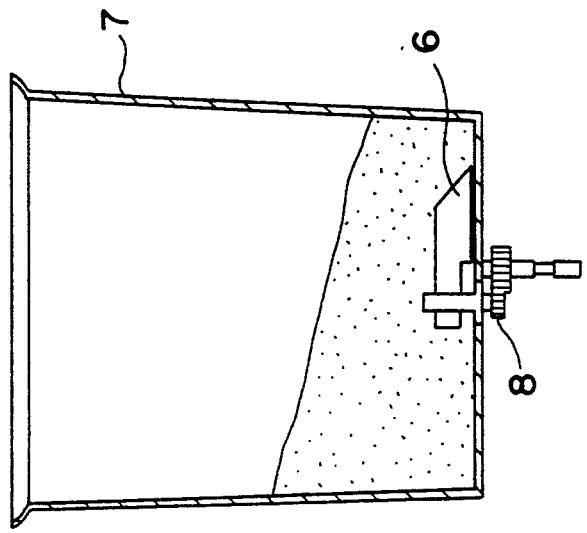
FIG. 3 is a sectional view of a general container inclusive of a kneading wing.

In FIG. 3, a container 7 is shown as a state that materials for kneading is full. A kneading wing 6 is fixed on the inner bottom of the container 7 and a driver gear 8 for driving the kneading wing 6 is attached at the outer bottom of the container 7.

Figure 5:
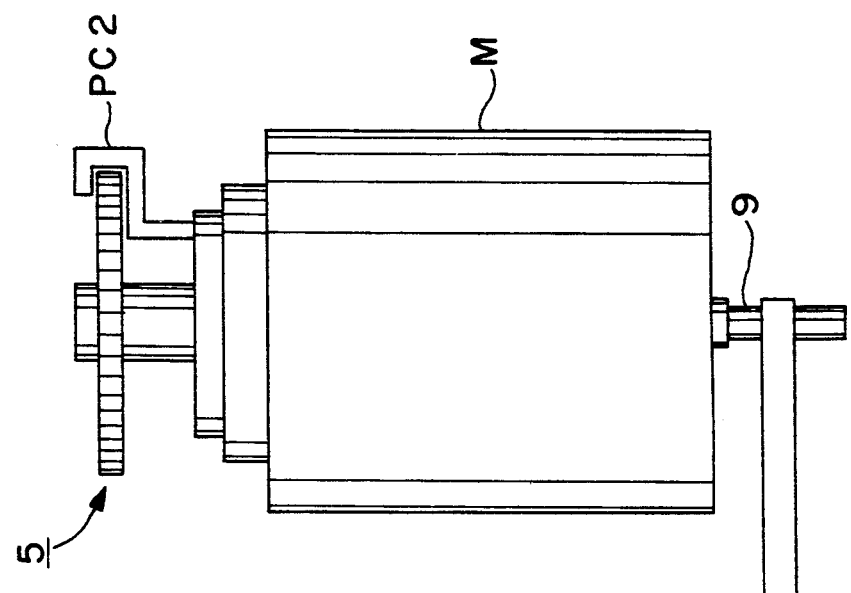
FIG. 5 is a front view of the present invention illustrating rotations of the kneading wing and the rotation member.
Figure 5:
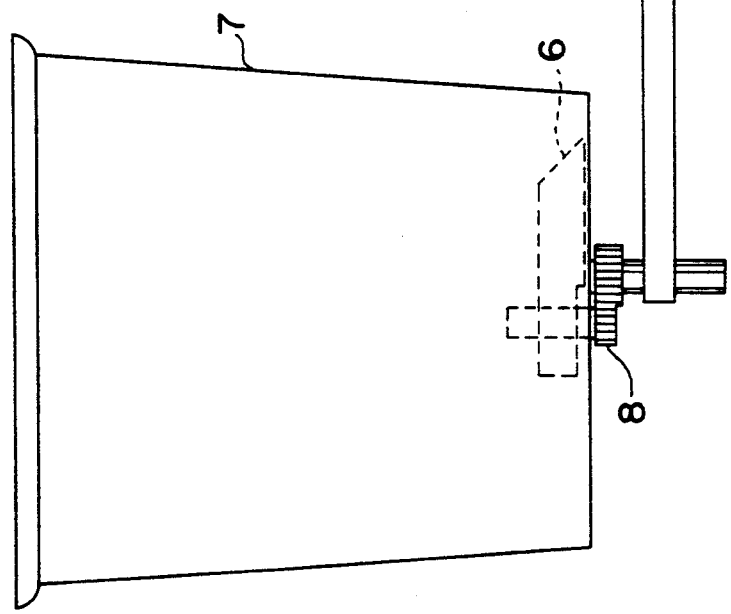
Figure 6:
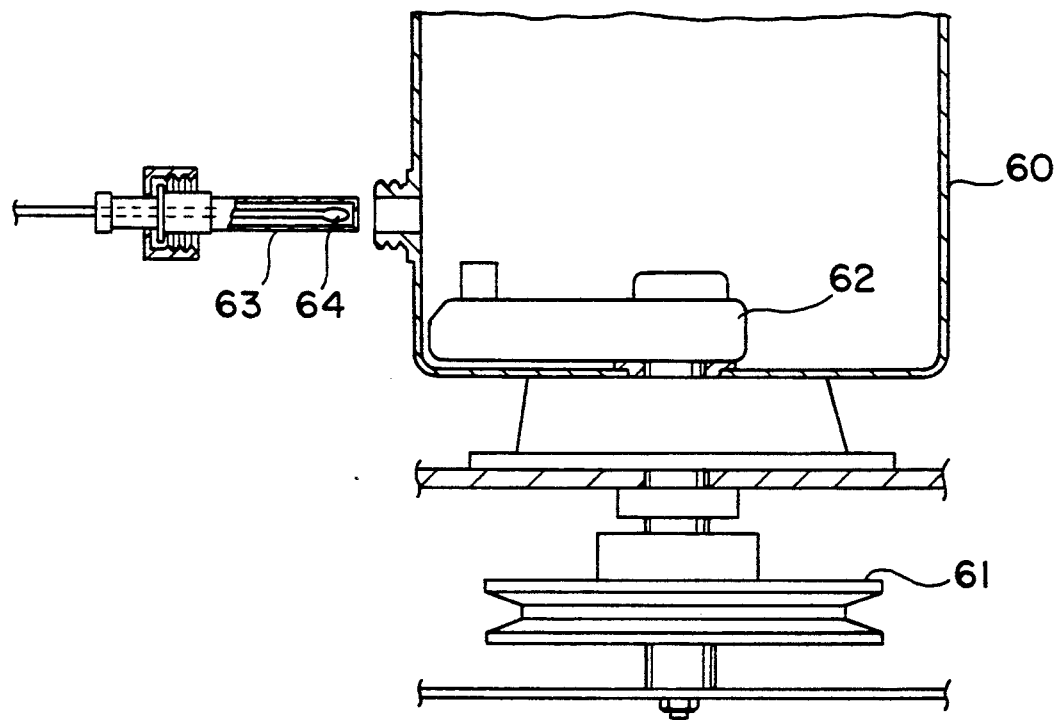
FIG. 6 is a sectional view of the prior kneading apparatus.

FIG. 5 is a front view for illustrating the present invention.

A kneading wing 6 is attached in the container 7 and the driver gear 8 rotates the kneading wing 6 from the rotation of the motor M through a belt 10.

The motor M has a protruded shaft up and down, the lower part of the shaft 9 drives the belt 10 and the upper part of the shaft 9 drives the rotating member 5.

Four parts of FIG. 1 are omitted in FIG. 5 except sensing device PC2.

Figure 4:
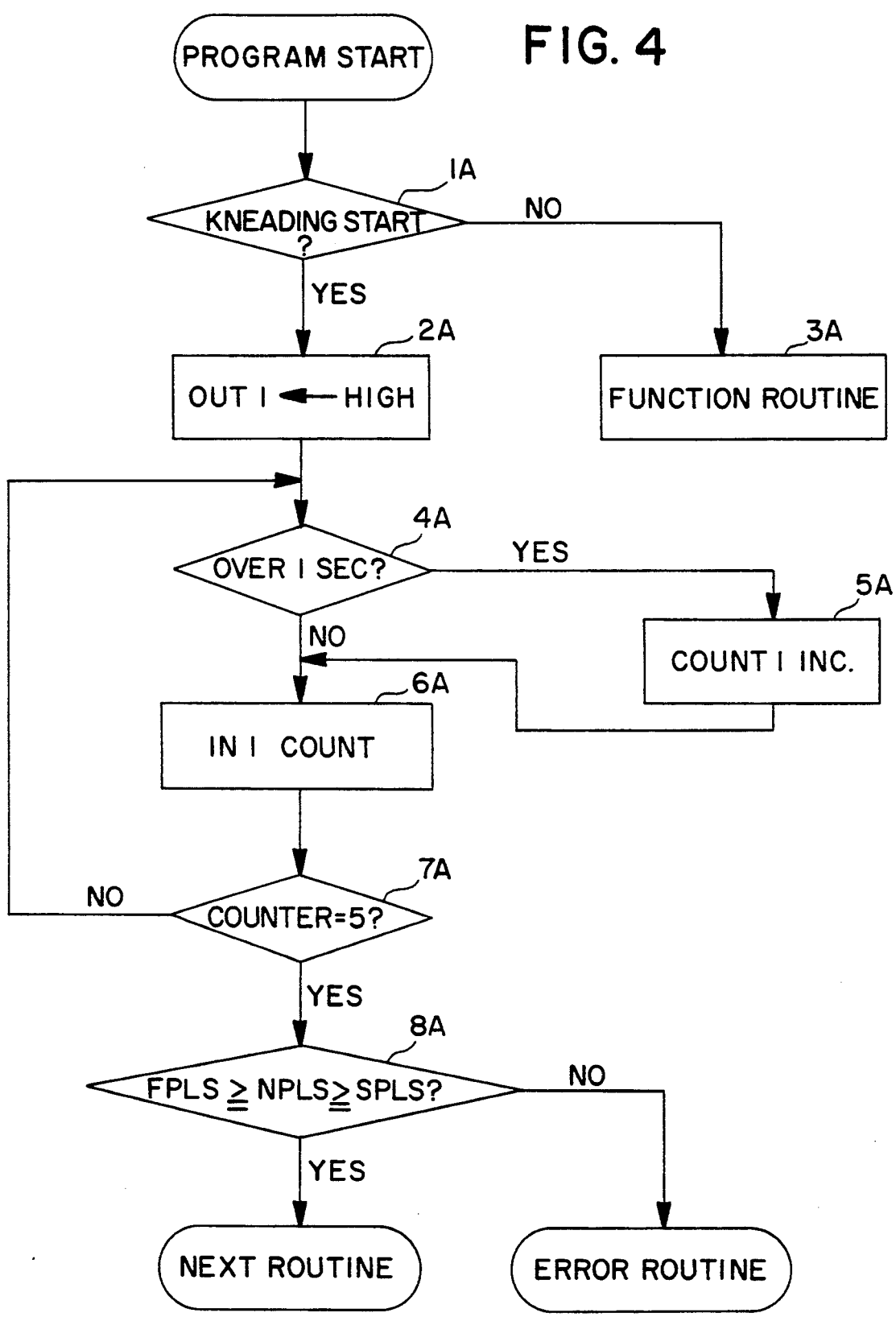
FIG. 4 is a flow chart of the present invention.

Operations of the present invention are illustrated with a flow chart of FIG. 4.

Many materials such as flour, egg, water, etc. are put in the container 7 and the belt 10 connects the shaft 9 and the driver gear 8 for transmitting rotation of the motor M.

At that time, switch SW1 is turned on by user and then, power Vcc is supplied into the micro computer MICOM through input terminal IN2 and the control part 1 of micro computer MICOM starts a memorized program as the flow chart of FIG. 4.

If kneading does not start as in step 1A, it is a state that the switch SW1 is not turned on and as indicated in function routine as in step 3A. If kneading start 5, it operates next step 2A.

In step 2A, micro computer MICOM outputs high level from output terminal OUT1 to a base of the transistor Q1 through resistance R1 and the transistor Q1 is turned on and also photo coupler PC1 is turned on. The diac DI current of the photo coupler PC1 triggers the gate of the triac T1 and power is supplied from plug AC into the motor M by the triac T1.

Resistances R3 and R4 and condenser C1 are for the protection of the triac T1 and the other resistances R1 and R2 are for biasing of the transistor Q1.

As motor M is turned on, the rotating member 5 inclusive of rotating disk 5a and hole means 5b is rotated by the shaft 9. The shaft 9 also rotates the kneading wing 6 through the belt 10 as in FIG. 5.

As the c-shaped sensing device PC2 has a light emission diode LED 2 and photo transistor PTR respectively up and down, the light from the light emission diode LED2 is passed to the photo transistor through the hole means 5b or is intercepted by the edge parts of the rotating member 5 exclusive of the hole means 5b.

As photo transistor PTR is turned on, the transistor Q2 is also turned on. If transistor Q2 is turned on and off repeatedly, a rectangular pulse signal is generated and is supplied into the input terminal IN1 of micro computer MICOM.

The micro computer counts the input pulse signal which is generated from counting of revolution numbers of the motor M at the sensing parts 3.

The micro computer MICOM of control part 1 counts input pulse signal for 5 seconds from step 4A to step 7A.

If a counting time of the input pulse from the sensing parts 3 is over 1 second as in step 4A, a counter of the micro computer MICOM increases 1 as in step 5A and then, counts the input signal from input terminal IN1 as in step 6A.

If a counting time of the input pulse is not over 1 sec, it counts only pulse numbers continually without increasing of the counter as in step 6A.

If counter indicate 5 i.e. 5 seconds, it starts step 8A.

If counter doesn't indicates 5 i.e. 5 seconds, it returns to step 4A and repeats from step 4A to step 7A. In step 8A, NPLS is the counted pulse data for 5 seconds in kneading materials with kneading wing, SPLS is lower limit value of the memorized pulse data for 5 seconds and FPLS is upper limit value of the memoried pulse data for 5 seconds.

If the kneading wing 6 is not placed into the container 7, the shaft 9 of motor M will rotate faster than when the kneading wing 6 is placed into the container 7.

FPLS is a memorized upper limit value for 5 seconds when the kneading wing 6 is installed into the container 7.

SPLS is a memorized lower limit value for 5 seconds when the rotation of kneading wing 6 is the lowest value.

If the counted data MPLS for 5 seconds from the revolution of the motor M is between the memorized limit values FPLS and SPLS, micro computer MICOM decides a normal state that the kneading wing 6 is installed into the container 7 and then, performs next routine. If the counted data NPLS for 5 seconds is higher than the upper limit value FPLS or the data is lower than the lower limit value SPLS, micro computer MICOM decides error states which the motor M is not rotated or which the kneading wing 6 is not placed into the container 7. So micro computer MICOM transmits high level from output terminal OUT2 to the transistor Q3 of alarm part 4 through resistance R8 and the buzzer BZ rings as the transistor Q3 is turned on. Also, micro computer MICOM transmits low level to the driving part 2 through output terminal OUT1 so, the driving part 2 inclusive of the motor M can't be operated.

As mentioned above, present invention generates a pulse signal according to the revolution of the motor and the pulse signal is compared with the memorized pulse signal.

If said compared value indicates that the kneading wing is not placed in the container or the motor is out of order, the buzzer is rung by the compared data.

What is claimed is:

1. A kneading wing sensing apparatus for baking bread, comprising:
control means having selected data in a memory for comparing input data with said selected data, and for transmitting a control signal based on the compared result;
driving means for rotating a motor upon reception of the control signal;
sensing means for detecting a number of rotations of the motor, for generating pulse signals corresponding to the number of rotations and for transmitting the pulse signals to the control means; and alarm means for generating an alarm signal when the control signal indicates one of either that the motor does not rotate entirely and that a kneading wing is not installed into a container.

2. A kneading wing sensing apparatus as claimed in claim 1, wherein said control means is a micro computer.

3. A kneading wing sensing apparatus as claimed in claim 1, wherein said driving means comprises resistors, condenser, transistor, triac and photo coupler, rotates the motor by triggering the triac upon reception of the control signal through the transistor and the photo coupler serially.

4. A kneading wing sensing apparatus as claimed in claim 1, wherein said sensing means comprises a resistor, transistor and sensing device.

5. A kneading wing sensing apparatus as claimed in claim 4, wherein said sensing device is a photo interrupter, said photo interrupter senses rotation of the motor by means of a rotating member having multiple hole means with regular intervals on its periphery and being rotated on a same shaft of the motor.

6. A device for kneading dough, comprising:
means for containing a mass of dough;
a motor spindle for driving a kneading wing within said mass of dough;
sensing means for detecting a number of rotations of said motor spindle and for generating a pulse signal corresponding to rotational frequency of said motor spindle;
control means for storing rotational frequency parameters, for making a comparison of the frequency of said pulse signal with said rotational frequency parameters, and for generating a control signal based on the comparison; and
means for generating an alarm signal in dependence upon said control signal.

7. The device of claim 6, wherein said sensing means comprises:
a disk rotating with said motor spindle having a plurality of holes spaced apart on its periphery; and
a light emission diode and a light receiving device separated from each other by the periphery of said disk.

8. The device of claim 6, wherein said driving means stops the rotation of said motor spindle in response to said alarm signal, said alarm signal being generated when said control signal indicates that said rotational frequency is not within said rotational frequency parameters.

9. The device of claim 6, wherein said rotational frequency parameters define a state of said rotational frequency corresponding to a kneading wing not being attached to said motor spindle.

10. The device of claim 9, wherein said rotational frequency parameters define a state of said rotational frequency corresponding to said motor spindle being unable to rotate.

11. The device of claim 6, wherein said rotational frequency parameters define a state of said rotational frequency corresponding to said motor spindle being unable to rotate.

12. A process for kneading dough, comprising the steps of:
rotating a motor spindle for driving a kneading wing within a mass of dough;
counting number of rotations of said motor spindle during a fixed time interval to provide a rotational value indicative of said number of rotations;
comparing said rotational value indicative of said number of rotations of said motor spindle to predetermined parameters; and
generating an alarm signal when said rotational value is not within said predetermined parameters.

13. The process of claim 12, further comprised of stopping the rotation of said motor spindle in response to said alarm signal.

14. The process of claim 12, wherein said predetermined parameters are respectively representative of a maximum and minimum number of rotations of said spindle motor driving said kneading wing during said fixed time interval.

15. The process of claim 12, wherein said predetermined parameters define a state of a rotational value corresponding to a kneading wing not being attached to said motor spindle and a state of a rotational value corresponding to said motor spindle being unable to rotate.

* * * * *

UNITED STATES PATENT AND TRADEMARK OFFICE
CERTIFICATE OF CORRECTION

PATENT NO. : 5,145,252
DATED : 8 September 1992
INVENTOR(S) : Keun-Yeong OH

It is certified that error appears in the above-identified patent and that said Letters Patent is hereby corrected as shown below:

Title page, item [57] Abstract:
Line 5,    replace "wind" with --wing--.

Column 1,    Line 22,    replace "to be kneaded" with --kneading--.

Column 2,    Line 21,    delete "and" (second occurrence).

Signed and Sealed this

Seventh Day of September, 1993

Attest:

BRUCE LEHMAN

Attesting Officer

Commissioner of Patents and Trademarks